*H. C. Hart,*

*Mouse Trap.*

*No. 113,051.* *Patented Mar. 28, 1871.*

Witnesses
L. Haselin.
Guys G. Sills

Inventor.
Hubert C. Hart
by W. E. Simonds
Solicitor Hartford, Ct.

United States Patent Office.

HUBERT C. HART, OF UNIONVILLE, CONNECTICUT.

Letters Patent No. 113,051, dated March 28, 1871.

IMPROVEMENT IN MOUSE-TRAPS.

The Schedule referred to in these Letters Patent and making part of the same.

I, HUBERT C. HART, of Unionville, in the county of Hartford and State of Connecticut, have invented an Improved Mouse-Trap, of which the following is a specification.

Nature and Objects of the Invention.

This invention is an improvement upon the mouse-trap covered by Letters Patent of the United States, No. 110,357, dated December 20, A. D. 1870, and issued to me.

It consists in an improved form given to the head of the bait-hook, a projection from the bait-hook, starting from it just under where the bait-hook catches over the saddle of the spring-bow, upon which the saddle will strike when the spring-bow is pressed down, and thus throw the catch in the bait-hook over the saddle, making the trap self-setting.

Description of the Accompanying Drawing.

Figure 1:
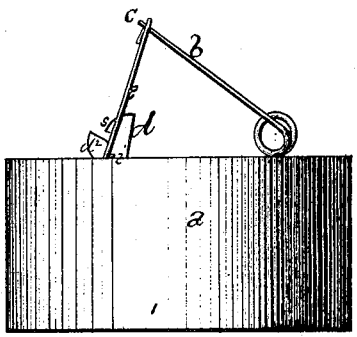
Figure 2:
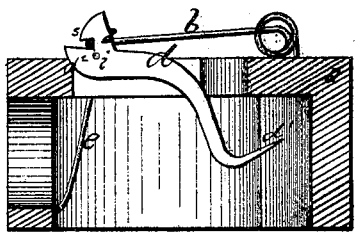
Figure 3:
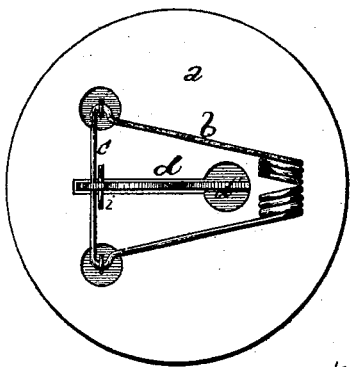

Figure 1 is a side elevation of the trap unset.
Figure 2 is a central vertical section of the trap set.
Figure 3 is a plan view of the trap set.

General Description.

The letter $a$ indicates the wooden block forming the body of the trap.

$b$, the spring-bow.
$c$, the saddle thereof.
$d$, the bait-hook.
$e$, the choker.

This trap has no lever, the bait-hook being pivoted at $i$, and extending backward therefrom; the bait is fastened on the point $d^1$.

When the spring-bow is pressed down the saddle catches under the hook or catch $s$, and the trap is set. The mouse pulling forward upon the bait springs the trap and catches the mouse.

Thus far I have described the trap as it was before my present improvement, which is to make the projection $d^2$ on the bait-hook, on which the saddle will strike when pressed down, and thus bring the catch $s$ over the saddle and setting the trap.

The line defining the upper side of the projection $d^2$ slants somewhat obliquely upward and outward, instead of standing straight out on a level, so as to facilitate the self-setting action.

The line which defines the upper side of the catch $s$ obliques in an exactly opposite direction, that the catch may surely hold upon the saddle when the trap is set.

Claim.

I claim as my invention—

As an improvement upon the trap covered by patent No. 110,357, the construction of the bait-hook described herein, having the projection $d^2$, for the purpose set forth.

HUBERT C. HART.

Witnesses:
J. E. HAMILTON,
T. C. BROOKS.